(12) United States Patent
Lampe et al.

(10) Patent No.: US 9,869,477 B2
(45) Date of Patent: Jan. 16, 2018

(54) MIXER ASSEMBLY AND METHOD FOR OPERATING A MIXER ASSEMBLY

(71) Applicant: Airbus Operations GmbH, Hamburg (DE)

(72) Inventors: Dietrich Lampe, Hamburg (DE); Thomas Scherer, Hamburg (DE); Jens Lohmar, Hamburg (DE); Michael Markwart, Hamburg (DE); Martin Schmid, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 822 days.

(21) Appl. No.: 14/296,593

(22) Filed: Jun. 5, 2014

(65) Prior Publication Data

US 2014/0287672 A1 Sep. 25, 2014

Related U.S. Application Data

(63) Continuation of application No. PCT/EP2012/075486, filed on Dec. 14, 2012.

(Continued)

(30) Foreign Application Priority Data

Dec. 15, 2011 (DE) .................. 10 2011 121 268

(51) Int. Cl.
*F24F 3/12* (2006.01)
*B64D 13/00* (2006.01)
*B64D 13/06* (2006.01)

(52) U.S. Cl.
CPC ................ *F24F 3/12* (2013.01); *B64D 13/00* (2013.01); *B64D 2013/0655* (2013.01); *Y02T 50/56* (2013.01)

(58) Field of Classification Search
CPC ........ B64D 13/08; B64D 13/06; B64D 13/00; B60H 1/24; F24F 11/0001

(Continued)

(56) References Cited

U.S. PATENT DOCUMENTS 5,545,084 A * 8/1996 Fischer .................. B64D 13/08
454/76
2003/0066929 A1 4/2003 Valencia et al.

(Continued)

FOREIGN PATENT DOCUMENTS

CA 2732074 A1 * 2/2010 ............. B64D 13/00
CN 102202970 9/2011

(Continued)

OTHER PUBLICATIONS

Chinese Office Action, dated Apr. 17, 2015.
International Search Report, dated Mar. 5, 2013.

*Primary Examiner* — Steven B McAllister
*Assistant Examiner* — Ko-Wei Lin
(74) *Attorney, Agent, or Firm* — Greer, Burns & Crain Ltd.

(57) ABSTRACT

A mixer assembly for an air-conditioning system comprising a recirculation air line, connectable to a vehicle region to be air-conditioned, to remove recirculation air from the region, and an air-conditioning air line, connectable to an air-conditioning unit to remove conditioned air from the air-conditioning unit. A first mixing region, for mixing the recirculation air with the conditioned air, is connected to the two air lines. A second mixing region, for mixing the first mixing region air with recirculation air, is connected to the recirculation air line and the first mixing region. Also, a first supply line is connected to the first mixing region to supply air from the first mixing region to a first partial region of the vehicle region, and a second supply line is connected to the (Continued)

second mixing region to supply air from the second mixing region to a second partial region of the vehicle region.

20 Claims, 1 Drawing Sheet

Related U.S. Application Data

(60) Provisional application No. 61/570,860, filed on Dec. 15, 2011.
(58) Field of Classification Search
USPC .................................. 454/237, 239, 76, 141
See application file for complete search history.

(56) References Cited

U.S. PATENT DOCUMENTS

| 2005/0061913 | A1 | 3/2005 | McCoulgan et al. |
| 2011/0237173 | A1 | 9/2011 | Kelnhofer et al. |
| 2011/0264273 | A1* | 10/2011 | Grabinger ............ F24F 11/0001 700/276 |

FOREIGN PATENT DOCUMENTS

| DE | 102008035123 | 2/2010 |
| DE | 0102010014354 | 10/2011 |
| DE | 102010014354 | 10/2011 |
| EP | 1867568 | 12/2007 |
| WO | 03031261 | 4/2003 |

* cited by examiner

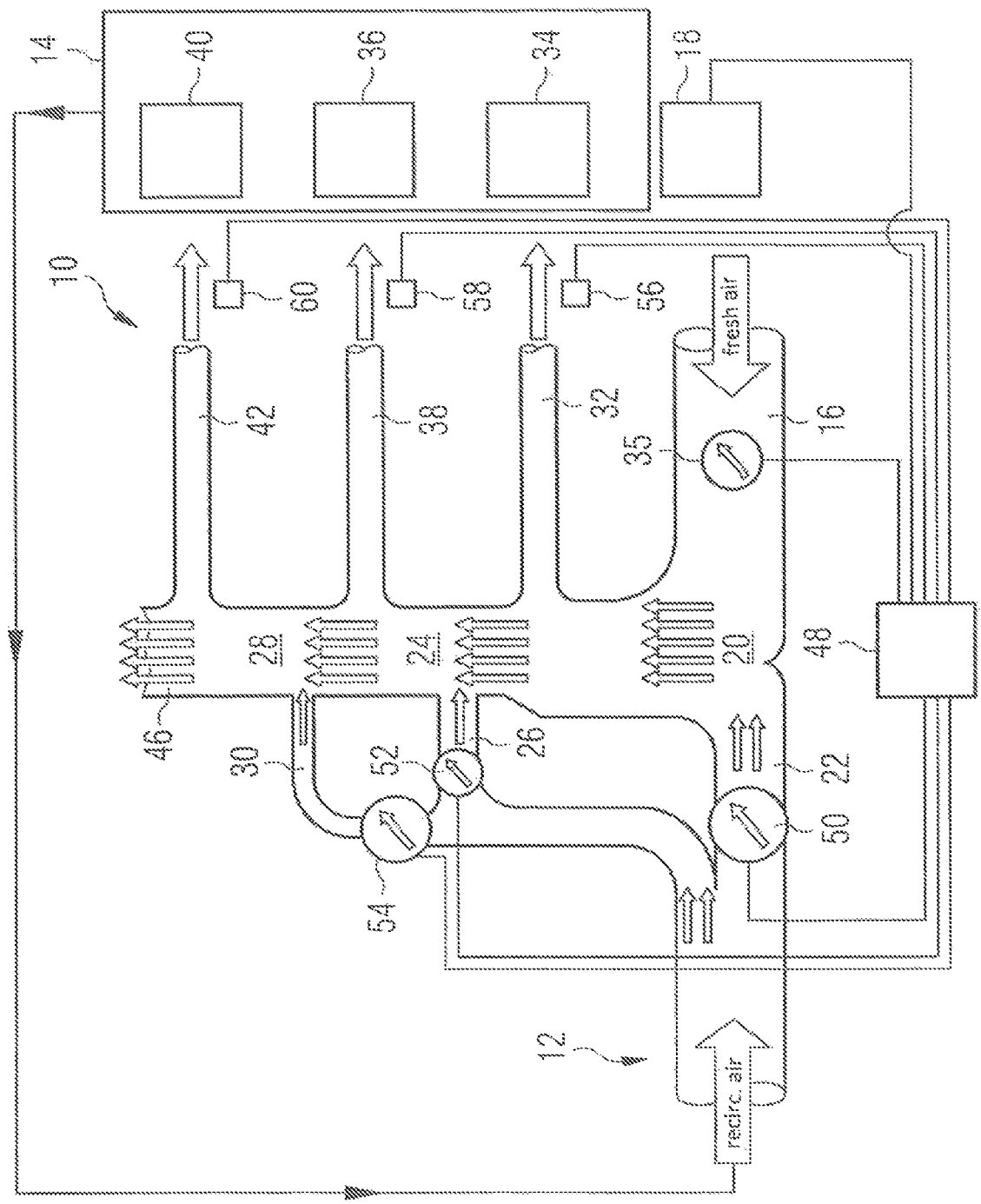

MIXER ASSEMBLY AND METHOD FOR OPERATING A MIXER ASSEMBLY

CROSS-REFERENCES TO RELATED APPLICATIONS

This application is a continuation of International Application PCT/EP2012/0754861 filed Dec. 14, 2012, designating the United States and published on Jun. 20, 2013 as WO 2013/087813. This application also claims the benefit of the U.S. Provisional Application No. 61/570,860, filed on Dec. 15, 2011, and of the German patent application No. 10 2011 121 268.3, filed on Dec. 15, 2011, the entire disclosures of which are incorporated herein by way of reference.

BACKGROUND OF THE INVENTION

The invention relates to a mixer assembly for an air-conditioning system and to a method for operating such a mixer assembly.

Air-conditioning systems are used for temperature control and supplying air to vehicles. In aircraft, in particular in modern passenger airplanes, an air-conditioning system provides not only for proper temperature control, but also for pressurizing the airplane cabin. A region of a vehicle that is to be air-conditioned is usually supplied with mixed air composed of air-conditioning air generated by an air-conditioning set and of recirculation air removed from the vehicle region that is to be air-conditioned. Air-conditioning systems operating according to this principle are described, for example, in DE 10 2008 035 123 A1 or DE 10 2010 014 354 A1.

SUMMARY OF THE INVENTION

The present invention is based on the object of specifying a mixer assembly that is suitable for use in an air-conditioning system, and a method for operating such a mixer assembly, which enable energy-saving air-conditioning of a vehicle region that is to be air-conditioned.

A mixer assembly according to the invention for an air-conditioning system comprises a recirculation air line, which is connectable to a region of a vehicle, in particular an airplane, to be air-conditioned, in order to remove recirculation air from the region of the vehicle to be air-conditioned. In addition, the mixer assembly has an air-conditioning air line, which is connectable to an air-conditioning unit in order to remove air-conditioning air, generated by the air-conditioning set, from the air-conditioning set. A first mixing region of the mixer assembly is connected to the recirculation air line and to the air-conditioning air line, for the purpose of mixing the recirculation air from the recirculation air line with the air-conditioning air from the air-conditioning air line. Further, a second mixing region of the mixer assembly, which is connected to the recirculation air line and to the first mixing region, serves to mix the mixed air from the first mixing region with further, pure recirculation air from the recirculation air line. Finally, the mixer assembly comprises a first supply line, which is connected to the first mixing region and which is adapted to supply mixed air from the first mixing region to a first partial region of the vehicle region to be air-conditioned, and a second supply line, which is connected to the second mixing region and which is adapted to supply mixed air from the second mixing region to a second partial region of the vehicle region to be air-conditioned.

The vehicle may be constituted by any vehicle to be air-conditioned. In particular, the vehicle may be a motor vehicle or an aircraft, in particular an airplane. In this sense, the terms "vehicle," "vehicle region," etc. used in this application may easily be replaced by the terms "motor vehicle" or "airplane" or "motor vehicle region" or "airplane region." A vehicle region to be air-conditioned is, in particular, an interior region of a vehicle to be air-conditioned, such as, for example, a cargo compartment or a passenger cabin, or another consumer on the vehicle that is to be supplied with air-conditioning air, recirculation air and/or mixed air. The vehicle region to be air-conditioned, from which the recirculation air is removed, may correspond to a vehicle region or all vehicle regions that is/are to be supplied with mixed air from the mixer assembly.

In the context of this application, the term "pure recirculation air" means recirculation air that has not been mixed or premixed with air-conditioning air. It is understood, however, that, within the meaning of this application, "pure recirculation air" can also be treated in a usual manner, i.e., for example, purified, humidified or de-humidified, filtered and/or compressed. It is substantive only that recirculation air is supplied to the first and the second mixing region of the mixer assembly from the same source, i.e., that the recirculation air supplied to the first mixing region has the same properties as the mixed air supplied to the second mixing region.

The use of the mixer assembly according to the invention makes it possible, firstly, for a portion of the recirculation air flowing through the recirculation air line to be mixed, in the first mixing region, with the air-conditioning air. A partial region or a plurality of partial regions of the vehicle region to be air-conditioned may then be supplied with the mixed air from the first mixing region, by means of one or more supply line(s). At the same time, a further portion of the recirculation air may be taken from the recirculation air line and routed into a second mixing region, which, in particular, is disposed downstream from the first mixing region, and in which the recirculation air is mixed with the already premixed mixing air from the first mixing region. Then, in turn, a partial region or a plurality of partial regions of the vehicle region to be air-conditioned may then be supplied with the mixed air from the second mixing region, by means of one or more supply line(s). If required, the mixer assembly may have further mixing regions, each of which, again, is supplied with recirculation air from the recirculation air line and with mixed air from a preceding mixing region, i.e., preferably disposed upstream. The further mixing regions may supply mixed air to further partial regions of the vehicle region to be air-conditioned, preferably via corresponding, further supply lines connected to the further mixing regions.

Accordingly, the invention, by dividing up the recirculation air and feeding it in a staged manner into the various mixing regions of the mixer assembly, allows vehicle regions to be supplied with air of differing mix ratios of recirculation air and air-conditioning air. This concept can be expanded by an optional number of stages, through the use of an optional number of mixing regions. The possibility thus exists for recirculation air from a recirculation air line to be mixed with air-conditioning air in a plurality of stages, it being possible to progressively increase the ratio of recirculation air to air-conditioning air. By means of the mixer assembly according to the invention, therefore, vehicle regions having differing heating and cooling requirements can be supplied with mixed air of differing temperature. In particular, it is possible for the mixed-air temperature to be adapted to the heating and cooling requirements in the respective vehicle regions to be air-conditioned, and consequently it is possible for the mixer assembly, or an air-conditioning system equipped with the mixer assembly, to be operated in an energy-saving manner.

In principle, in the case of the mixer assembly according to the invention, the mixing regions may be fixedly assigned to corresponding vehicle regions to be air-conditioned. In a preferred embodiment of the mixer assembly, however, it is possible for the mixed air to be supplied from the individual mixing regions to changing vehicle regions. This can be realized, for example, through connecting lines that connect the supply lines to each other. The operation of the mixer assembly can then be flexibly adapted, as required, to changing heating or cooling requirements in the respective vehicle regions that are to be air-conditioned.

When the mixer assembly according to the invention is in cooling mode, the temperature of the air-conditioning air generated by the air-conditioning unit is generally lower than the temperature of the recirculation air removed from the vehicle region to be air-conditioned. Further, the operation of the air-conditioning unit is preferably controlled in such a way that the temperature of the air-conditioning air generated by the air-conditioning unit is lower than the lowest set temperature of the various partial regions of the mixed air to be supplied to the vehicle region to be air-conditioned. Accordingly, owing to the lesser recirculation air/air-conditioning air ratio, the temperature of the mixed air in the first mixing region is lower than the temperature of the mixed air in the second mixing region. A particularly energy-efficient operation of the mixer assembly is therefore possible if a set temperature of the mixed air to be supplied, via the first supply line, to the first partial region of the vehicle region to be air-conditioned is lower, at least in certain operating phases of the mixer assembly, i.e., at least when the mixer assembly is in cooling mode, than a set temperature of the mixed air to be supplied, via the second supply line, to the second partial region of the vehicle region to be air-conditioned.

In an embodiment of the mixer assembly according to the invention that is of a structurally simple design, the recirculation air line is connected to the first mixing region via a first recirculation air line branch. Additionally or alternatively, the recirculation air line may be connected to the second mixing region via a second recirculation air line branch. Further mixing regions of the mixer assembly may likewise be connected to the recirculation air line via corresponding recirculation air line branches.

A first recirculation-air control valve, for controlling the recirculation air flow through the first recirculation air line branch, may be disposed in the first recirculation air line branch. Additionally or alternatively, a second recirculation-air control valve, for controlling the recirculation air flow through the second recirculation air line branch, may then also be disposed in the second recirculation air line branch. If the mixer assembly comprises further mixing regions, corresponding recirculation-air control valves are preferably to be provided also in the recirculation air line branches that connect these mixing regions to the recirculation air line. Finally, an air-conditioning-air control valve, for controlling the air-conditioning air flow through the air-conditioning air line, may also be disposed in the air-conditioning air line.

The mixer assembly preferably further comprises a control device, which is configured to control the temperature of the mixed air in the first mixing region in dependence on the set temperature of the mixed air to be supplied, via the first supply line, to the first partial region of the vehicle region to be air-conditioned, through corresponding control of the supply of recirculation air and/or air-conditioning air into the first mixing region. Further, the control device may be configured to control the temperature of the mixed air in the second mixing region in dependence on the set temperature of the mixed air to be supplied, via the second supply line, to the second partial region of the vehicle region to be air-conditioned, through corresponding control of the supply of recirculation air and/or air-conditioning air into the second mixing region. If the mixer assembly comprises further mixing regions, the control device is preferably also configured to control the temperature of the mixed air in the further mixing regions in dependence on the respective set temperatures of the mixed air to be supplied, via corresponding, further supply lines, to the respective further partial regions of the vehicle region to be air-conditioned, through corresponding control of the supply of recirculation air and/or air-conditioning air into the further mixing regions.

The set temperatures of the mixed air to be supplied to the respective partial regions of the vehicle region to be air-conditioned may be defined manually, for example by means of a user interface, by onboard or vehicle personnel. As an alternative to this, the set temperatures may also be defined by the control device or by another control device, and, in particular, a memory for storing the set temperatures may be provided for this purpose. The supply of recirculation air into the individual mixing regions of the mixer assembly is preferably controlled by the control device through corresponding control of the recirculation-air control valves disposed in the recirculation air line branches. Similarly, the control device preferably controls the supply of air-conditioning air into the first mixing region through corresponding control of the air-conditioning-air control valve disposed in the air-conditioning air line.

The control device may be configured to control the temperature of the mixed air in the first mixing region in dependence on a measured actual temperature of the mixed air supplied, via the first supply line, to the first partial region of the vehicle region to be air-conditioned. Further, the control device may be configured to control the temperature of the mixed air in the second mixing region in dependence on a measured actual temperature of the mixed air supplied, via the second supply line, to the second partial region of the vehicle region to be air-conditioned. Similarly, the control device may clearly also be configured to control the temperature of the mixed air in further mixing regions of the mixer assembly in dependence on corresponding measured actual temperatures of the mixed air supplied, via a corresponding, further supply line, to further partial regions of the vehicle region to be air-conditioned. The actual temperatures of the mixed air supplied to the various partial regions of the vehicle region to be air-conditioned may be measured by means of suitable temperature sensors, which may be disposed, for example, in the supply lines connected to the various partial regions of the vehicle region to be air-conditioned. If required, the control device may additionally be configured, in controlling the temperature of the mixed air in the individual mixing regions of the mixer assembly, to take account of one or more room-temperature actual value(s), preferably measured by sensor means, in a partial region or a plurality of partial regions of the vehicle region to be air-conditioned.

In a preferred embodiment of the mixer assembly, the mixer assembly is aligned substantially vertically. In particular, the second mixing region may be disposed above the first mixing region, Alternatively or additionally, the second recirculation air line branch may be connected to the mixer assembly, above the first recirculation air line branch. Further, it is conceivable for the second supply line to be connected to the mixer assembly, above the first supply line. Finally, the air-conditioning air line may be connected to the mixer assembly, beneath the first, or lowermost, mixing region. In the case of such a configuration of the mixer assembly, it is possible to utilize the thermal uplift to support the separation of the air layers having differing temperatures in the individual mixing regions of the mixer assembly.

In a method according to the invention for operating a mixer assembly for an air-conditioning system, recirculation air is removed from a region of a vehicle, in particular an airplane, to be air-conditioned. Further, air-conditioning air, generated by an air-conditioning unit, is removed from the air-conditioning unit. In a first mixing region of the mixer assembly, the air-conditioning air is mixed with the recirculation air. In a second mixing region of the mixer assembly, the mixed air from the first mixing region is mixed with further, pure recirculation air. A first partial region of the vehicle region to be air-conditioned is supplied with mixed air from the first mixing region. A second partial region of the vehicle region to be air-conditioned, on the other hand, is supplied with mixed air from the second mixing region.

A set temperature of the mixed air to be supplied to the first partial region of the vehicle region to be air-conditioned is preferably lower, at least in certain operating phases of the mixer assembly, than a set temperature of the mixed air to be supplied to the second partial region of the vehicle region to be air-conditioned.

The recirculation air may be supplied to the first mixing region via a first recirculation air line branch of a recirculation air line. Alternatively or additionally, the recirculation air may be supplied to the second mixing region via a second recirculation air line branch of a recirculation air line.

The recirculation air flow through the first recirculation air line branch may be controlled by a first recirculation-air control valve disposed in the first recirculation air line branch. Alternatively or additionally, the recirculation air flow through the second recirculation air line branch may be controlled by a second recirculation-air control valve disposed in the second recirculation air line branch. Further, the air-conditioning air flow through the air-conditioning air line may be controlled by an air-conditioning-air control valve disposed in the air-conditioning air line.

The temperature of the mixed air in the first mixing region may be controlled in dependence on the set temperature of the mixed air to be supplied to the first partial region of the vehicle region to be air-conditioned, through corresponding control of the supply of recirculation air and/or air-conditioning air into the first mixing region. Further, the temperature of the mixed air in the second mixing region may be controlled in dependence on the set temperature of the mixed air to be supplied to the second partial region of the vehicle region to be air-conditioned, through corresponding control of the supply of recirculation air and/or air-conditioning air into the second mixing region.

The temperature of the mixed air in the first mixing region is preferably controlled in dependence on a measured actual temperature of the mixed air supplied to the first partial region of the vehicle region to be air-conditioned. Alternatively or additionally, the temperature of the mixed air in the second mixing region may be controlled in dependence on a measured actual temperature of the mixed air supplied to the second partial region of the vehicle region to be air-conditioned.

A mixer assembly described above and/or a method described above may be used particularly advantageously in an airplane air-conditioning system.

BRIEF DESCRIPTION OF THE DRAWINGS

The invention is explained more fully in the following with reference to the appended schematic FIGURE, which shows a representation of a mixer assembly suitable for use in an air-conditioning system, in particular an airplane air-conditioning system.

DETAILED DESCRIPTION OF THE PREFERRED EMBODIMENTS

A mixer assembly shown in the FIGURE is denoted in general by 10. The mixer assembly 10 is provided for use in an airplane air-conditioning system, and comprises a recirculation air line 12, which removes the recirculation air from a region 14 of an airplane that is to be air-conditioned, for example an airplane passenger cabin. The recirculation air line 12 carries pure recirculation air, i.e., recirculation air which is not mixed with air-conditioning air or other air. In addition, the mixer assembly 10 has an air-conditioning air line 16, which is connected to an air-conditioning unit 18 of the airplane air-conditioning system and which removes air-conditioning air, generated by the air-conditioning unit 18, from the air-conditioning unit 18.

A first mixing region 20 of the mixer assembly 10 is connected to the recirculation air line 12 via a first recirculation air line branch 22 that branches off from the recirculation air line 12. Further, the first mixing region 20 is connected to the air-conditioning air line 16. In the first mixing region 20, the air-conditioning air flowing through the air-conditioning air line 16 is mixed with recirculation air, which is routed out of the recirculation air line 12 and into the first recirculation air line branch 22. A second mixing region 24 of the mixer assembly 10, on the other hand, is connected to the first mixing region 20 and to a second recirculation air line branch 26 that branches off from the recirculation air line 12. In the second mixing region 24, mixed air generated in the first mixing region 20 is mixed with further, pure recirculation air from the recirculation air line 12. Finally, the mixer assembly 10 comprises a third mixing region 28. The third mixing region 28 is connected to the second mixing region 24 and to a third recirculation air line branch 30 that branches off from the recirculation air line 12, such that, in the third mixing region 28, mixed air generated in the second mixing region 24 is mixed with further, pure recirculation air from the recirculation air line 12. In the second mixing region 24, the mix ratio of recirculation air to air-conditioning air is therefore higher than in the first mixing region 20, but lower than in the third mixing region 28. If required, the mixer assembly 10 may be provided with further mixing regions, which are each connected to a preceding mixing region, i.e., disposed upstream, and to a recirculation air line branch that branches off from the recirculation air line 12.

Connected to the first mixing region 20 there is a first supply line 32, which is adapted to supply mixed air from the first partial region 20 to a first partial region 34 of the airplane region 14 to be air-conditioned. The first partial region 34 of the airplane region 14 to be air-conditioned is, for example, a cargo compartment of the airplane. A second partial region 36 of the airplane region 14 to be air-conditioned is supplied with mixed air from the second partial region 24, via a second supply line 38 that is connected to the second mixing region 24. Finally, a third partial region 40 of the airplane region 14 to be air-conditioned is connected to a third supply line 42, and is thereby supplied with mixed air from the third mixing region 28. The second and the third partial region 36, 40 are, for example, regions of the airplane passenger cabin. Disposed in the first recirculation air line branch 22 there is a first recirculation-air control valve 50, for controlling the recirculation air flow through the first recirculation air line branch 22. Similarly, disposed in the second recirculation air line branch 26 there is a second recirculation-air control valve 52, for controlling the recirculation air flow through the second recirculation air line branch 26. Finally, a third recirculation-air control valve 54, disposed in the third recirculation air line branch 30, serves to control the recirculation air flow through the third recirculation air line branch 30. Disposed in the air-conditioning air line 26 there is an air-conditioning-air control valve 55, for controlling the air-conditioning air flow through the air-conditioning air line 16.

The mixer assembly 10 further comprises a control device 48. The control device 48 controls the operation of the air-conditioning set 18, when the mixer assembly, or the air-conditioning system, is in cooling mode, in such a way that the temperature of the air-conditioning air generated by the air-conditioning set 18 is lower than the temperature of recirculation air removed from the vehicle region that is to be air-conditioned. Further, the operation of the air-conditioning set 18 is controlled by the control device 48 such that the temperature of the air-conditioning air generated by the air-conditioning set 18 is lower than the lowest set temperature of the mixed air to be supplied to the various partial regions 34, 36, 40 of the airplane region 14 that is to be air-conditioned. Accordingly, owing to the higher recirculation air/air-conditioning air ratio, the temperature of the mixed air in the second mixing region 24 is higher than the temperature of the mixed air in the first mixing region 20, but lower than in the third mixing region 28.

The set temperatures of the mixed air to be supplied to the respective partial regions 34, 36, 40 of the airplane region 14 to be air-conditioned may be defined manually or by the control device 48. When the mixer assembly 10 is in cooling mode, the set temperature of the mixed air to be supplied, via the second supply line 38, to the second partial region 36 of the airplane region 14 to be air-conditioned is higher than the set temperature of the mixed air to be supplied, via the first supply line 32, to the first partial region 34 of the airplane region 14 to be air-conditioned, but lower than the set temperature of the mixed air to be supplied, via the third supply line 42, to the third partial region 40 of the airplane region 14 to be air-conditioned. Through a corresponding assignment of the partial regions 34, 36, 40 of the airplane region 14 to be air-conditioned to the corresponding mixing regions 20, 24, 28, the supply of additional recirculation air, i.e., the increasing recirculation air/air-conditioning air ratio, can be used for energy-saving adaptation of the mixed-air temperature in the respective mixing regions 20, 24, 28 to the set temperatures of the mixed air to be supplied to the corresponding partial regions 34, 36, 40 of the airplane region 14 to be air-conditioned.

In particular, the control device 48 controls the temperature of the mixed air in the respective mixing regions 20, 24, 28 in dependence on the set temperature of the mixed air to be supplied to the corresponding partial regions 34, 36, 40 of the airplane region 14 to be air-conditioned, through corresponding control of the supply of recirculation air and/or air-conditioning air into the respective mixing regions 20, 24, 28. For this purpose, the control device 48 operates correspondingly the recirculation-air control valves 50, 52, 54 disposed in the recirculation air line branches 22, 26, 30, or the air-conditioning-air control valve 55 disposed in the air-conditioning air line 16. Further, in controlling the supply of recirculation air and/or air-conditioning air into the respective mixing regions 20, 24, 28, the control device 48 takes account of measured actual temperatures of the mixed air supplied to the various partial regions 34, 36, 40 of the airplane region 14 to be air-conditioned. These actual temperatures are measured by temperature sensors 56, 58, 60, which are disposed in the supply lines 32, 38, 42 and which transmit to the control device 48 characteristic signals for the respective actual temperatures of the mixed air flowing through the supply lines 32, 38, 42.

The mixer assembly 10 is aligned vertically, such that the second mixing region 24 is disposed above the first mixing region 20 and beneath the third mixing region 28. Further, the second recirculation air line branch 26 is connected to the mixer assembly 10, above the first recirculation air line branch 22 and beneath the third recirculation air line branch 30. Similarly, the second supply line 38 is connected to the mixer assembly 10, above the first supply line 32 and beneath the third supply line 42. Finally, the air-conditioning air line 16 is connected to the mixer assembly 10, beneath the first, i.e., the lowermost, mixing region 20. In the case of such a configuration of the mixer assembly 10, the thermal uplift, i.e., the rising of warm air, can be utilized to support the separation of the air layers having differing temperatures in the individual mixing regions 20, 24, 28 of the mixer assembly 10.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A mixer assembly for an air-conditioning system, comprising:
   a recirculation air line, which is connectable to a region of a vehicle to be air-conditioned, in order to remove recirculation air from the region of the vehicle to be air-conditioned,
   an air-conditioning air line, which is connectable to an air-conditioning unit in order to remove air-conditioning air, generated by the air-conditioning unit, from the air-conditioning unit,
   a first mixing region, connected to the recirculation air line and to the air-conditioning air line, for mixing the recirculation air from the recirculation air line with the air-conditioning air from the air-conditioning air line,
   a second mixing region, connected to the recirculation air line and to the first mixing region, for mixing mixed air from the first mixing region with further, pure recirculation air from the recirculation air line,
   a first supply line, which is connected to the first mixing region and which is adapted to supply mixed air from the first mixing region to a first partial region of the vehicle region to be air-conditioned, and
   a second supply line, which is connected to the second mixing region and which is adapted to supply mixed air from the second mixing region to a second partial region of the vehicle region to be air-conditioned.

2. The mixer assembly according to claim 1, wherein a set temperature of the mixed air to be supplied, via the first supply line, to the first partial region of the vehicle region to be air-conditioned is lower, at least in certain operating phases of the mixer assembly, than a set temperature of the mixed air to be supplied, via the second supply line, to the second partial region of the vehicle region to be air-conditioned.

3. The mixer assembly according to claim 1, wherein the recirculation air line is connected to the first mixing region via a first recirculation air line branch, and wherein the recirculation air line is connected to the second mixing region via a second recirculation air line branch.

4. The mixer assembly according to claim 3, wherein a first recirculation-air control valve for controlling the recirculation air flow through the first recirculation air line branch is disposed in the first recirculation air line branch.

5. The mixer assembly according to claim 3, wherein a second recirculation-air control valve for controlling the recirculation air flow through the second recirculation air line branch is disposed in the second recirculation air line branch.

6. The mixer assembly according to claim 3, wherein an air-conditioning-air control valve for controlling the air-conditioning air flow through the air-conditioning air line is disposed in the air-conditioning air line.

7. The mixer assembly according to claim 1, further comprising a control device, which is configured to control the temperature of the mixed air in the first mixing region in dependence on a set temperature of the mixed air to be supplied, via the first supply line, to the first partial region of the vehicle region to be air-conditioned, through corresponding control of the supply of at least one of recirculation air and air-conditioning air into the first mixing region.

8. The mixer assembly according to claim 1, further comprising a control device which is configured to control the temperature of the mixed air in the second mixing region in dependence on a set temperature of the mixed air to be supplied, via the second supply line, to the second partial region of the vehicle region to be air-conditioned, through corresponding control of the supply of at least one of recirculation air and air-conditioning air into the second mixing region.

9. The mixer assembly according to claim 7, wherein the control device is configured to control the temperature of the mixed air in the first mixing region in dependence on a measured actual temperature of the mixed air supplied, via the first supply line, to the first partial region of the vehicle region to be air-conditioned.

10. The mixer assembly according to claim 7, wherein the control device is configured to control the temperature of the mixed air in the second mixing region in dependence on a measured actual temperature of the mixed air supplied, via the second supply line, to the second partial region of the vehicle region to be air-conditioned.

11. The mixer assembly according to claim 1, wherein at least one of:
the second mixing region is disposed above the first mixing region,
the second recirculation air line branch is connected to the mixer assembly, above the first recirculation air line branch, and
the second supply line is connected to the mixer assembly, above the first supply line; and
the air-conditioning air line is connected to the mixer assembly, beneath the first, or lowermost, mixing region.

12. A method for operating a mixer assembly for an air-conditioning system, comprising the steps:

removing recirculation air from a region of a vehicle to be air-conditioned,
removing air-conditioning air, generated by an air-conditioning unit, from the air-conditioning unit,
mixing the air-conditioning air with the recirculation air in a first mixing region,
mixing mixed air from the first mixing region with further, pure recirculation air in a second mixing region,
supplying mixed air from the first mixing region to a first partial region of the vehicle region to be air-conditioned, and
supplying mixed air from the second mixing region to a second partial region of the vehicle region to be air-conditioned.

13. The method according to claim 12, wherein a set temperature of the mixed air to be supplied to the first partial region of the vehicle region to be air-conditioned is lower, at least in certain operating phases of the mixer assembly, than a set temperature of the mixed air to be supplied to the second partial region of the vehicle region to be air-conditioned.

14. The method according to claim 12,
wherein the recirculation air is supplied to the first mixing region via a first recirculation air line branch of a recirculation air line, and
wherein the recirculation air is supplied to the second mixing region via a second recirculation air line branch of a recirculation air line.

15. The method according to claim 14, wherein the recirculation air flow through the first recirculation air line branch is controlled by a first recirculation-air control valve disposed in the first recirculation air line branch.

16. The method according to claim 14, wherein the recirculation air flow through the second recirculation air line branch is controlled by a second recirculation-air control valve disposed in the second recirculation air line branch.

17. The method according to claim 14, wherein the air-conditioning air flow through the air-conditioning air line is controlled by an air-conditioning-air control valve disposed in the air-conditioning air line.

18. The method according to claim 13, wherein the temperature of the mixed air in the first mixing region is controlled in dependence on the set temperature of the mixed air to be supplied to the first partial region of the vehicle region to be air-conditioned, through corresponding control of at least one of the supply of recirculation air and air-conditioning air into the first mixing region.

19. The method according to claim 13, wherein the temperature of the mixed air in the second mixing region is controlled in dependence on the set temperature of the mixed air to be supplied to the second partial region of the vehicle region that is to be air-conditioned, through corresponding control of the supply of at least one of recirculation air and air-conditioning air into the second mixing region.

20. The method according to claim 18, wherein the temperature of the mixed air in the first mixing region is controlled in dependence on a measured actual temperature of the mixed air supplied to the first partial region of the vehicle region to be air-conditioned, and wherein the temperature of the mixed air in the second mixing region is controlled in dependence on a measured actual temperature of the mixed air supplied to the second partial region of the vehicle region to be air-conditioned.

* * * * *